United States Patent

[11] 3,623,007

[72] Inventors Barry J. Eckhart
Ottawa, Province of Ontario, Canada;
Erna S. Hoover, Summit, N.J.
[21] Appl. No. 645,921
[22] Filed June 14, 1967
[45] Patented Nov. 23, 1971
[73] Assignee Bell Telephone Laboratories, Incorporated
Murray Hill, N.J.

[54] FEEDBACK CONTROL MONITOR FOR STORED PROGRAM DATA PROCESSING SYSTEM
17 Claims, 9 Drawing Figs.

[52] U.S. Cl. .................................................. 340/172.5
[51] Int. Cl. ................................................... G06f 9/18
[50] Field of Search ......................................... 349/172.5;
235/157; 179/18.9

[56] References Cited
UNITED STATES PATENTS
3,375,499   3/1968   Ghiron et al. ................. 340/172.5
3,409,877   11/1968  Alterman et al. ............. 340/172.5
3,344,406   2/1967   Vinal ............................. 340/172.5

OTHER REFERENCES
Harr, J. A. et al., Organization of the No. 1 ESS Stored Program, in the Bell System Technical Journal, 43(5), part 1: pp. 1,923–1,959, September, 1964. TK1.B435

Downing, R. W. et al., No. 1 ESS Maintenance Plan in the Bell System Technical Journal, 43(5), part 1: pp. 1,961 and 2,005–2,009, September, 1964.

Tuomenoksa, L. S. et al., Problems of Programming for Shared Real-Time Systems, in IEEE Transactions on Communication Technology, Com 15(1); pp. 5–10, February, 1967.

*Primary Examiner*—Gareth D. Shaw
*Assistant Examiner*—Sydney R. Chirlin
*Attorneys*—R. J. Guenther and James Warren Falk

ABSTRACT: Although it is known that the more urgent tasks which are to be processed by a stored program controlled data processing machine can be accommodated on a real-time basis by controlling the machine to work on these tasks more often, this procedure has not been sufficient to prevent overload during periods of heavy traffic. To assure efficient operation, a measure of machine occupancy is periodically obtained and is employed to control the number of new work entries which the machine is allowed to process per unit time interval and per visit to that class of work.

FIG. 5

PART OF CALL STORE 103

| | 22 | | | 0 |
|---|---|---|---|---|
| A6AØCW | ACØV | | | |
| MGMEAM | | | 1 ØVDEC | ØVØFFI |

| | 22 | 12 | 0 |
|---|---|---|---|
| M4ØVLD | | | E3RD |
| +1 | | 19  13 | E2ND |
| +2 | 20 | DECTIM | E1ST |
| +3 | | INCTIM | JTIM |

| | | |
|---|---|---|
| E2ØVTL | (5.4 SEC.) | ØVTL |
| E2DCTL | (3.0 SEC.) | DCTL |
| E2PHTL | (8.0 SEC.) | PHTL |
| E2DECT | (3.0 SEC.) | DECT |
| E2ØVJM | (1.25 SEC.) | ØVJM |
| E2NØJM | (1.0 SEC.) | NØJM |
| E2NØIM | (5.0 SEC.) | NØIM |
| E2ØVIM | (1.0 SEC.) | ØVIM |

| | 8 | |
|---|---|---|
| A6MAX5 | | RNGE |
| A6CNT5 | | |
| A6MAX | | 4  SEC5 |
| A6CNT | | |

| | | |
|---|---|---|
| E2USEC | | USEC |
| E2AMAX | | AMAX |

(PART OF CALL STORE 103)

6,623,007

FEEDBACK CONTROL MONITOR FOR STORED PROGRAM DATA PROCESSING SYSTEM

BACKGROUND OF THE INVENTION

This invention relates to the control of stored program data processing machines and, more particularly, to the more efficient use of such machines under high load conditions.

In the copending application of R. W. Downing et al. Ser. No. 334,875 filed Dec., 1963, now Pat No. 3,570,008, issued Mar. 9, 1971, a stored program controlled electronic switching system is disclosed having a central control which executes a variety of call processing, administrative and maintenance tasks. The machine operates in "real time" and accommodates input-output tasks, which cannot tolerate any appreciable delay, by interrupting the execution of base-level work. The base-level work that is brought in during an interrupt level is temporarily buffered in an area of memory called a "hopper" until it can be processed by one of the base-level programs. Work in the base level is divided into several classes and a program known as the executive control, or "main," base-level program determines the order in which and the number of times each of the several classes of base-level work is to be visited. In the aforementioned switching system, the format for the executive control program dictates that the class A base-level jobs be processed twice as often as class B base-level jobs, and so on, up to and including class E which is performed only one-eighth as often as class A. Accordingly, the tasks assigned to class A will suffer shorter delays on the average than those in class B and work is therefore assigned to the classes so that the more urgent tasks are done relatively more frequently than the less urgent tasks.

Processing of work in a particular base-level class occurs when the executive control program calls for the programs which dispense the contents of the buffers of the class. Heretofore, when the executive control program came around to allowing a particular dispenser program to run, the dispenser program "emptied" its associated buffer of all the work entries that were found to be stored therein. Thus, if 5 work entries had been stored in the buffer, the dispenser program would pass control five times to the "task" programs assigned to process the hopper entries. After all entries in a particular hopper have been dispensed and processed, the task dispenser program passes control, via the executive control program, to the next task dispenser program. When the task dispenser that had just relinquished control receives control again, it will examine its associated hopper and unload any new entries that may have been placed there in the interim by an input program.

As the processing load presented to the machine increases, the amount of work to do in each base-level class increases. This means that more time will elapse before the machine can go on to the next class of base-level work, and, naturally, that more time will elapse before the machine can return to do a specific class of work again. When the time between successive visits to a particular class (class E in the above system) exceeded certain limits, a real-time check program initiated an overload mode which turned off the line scanners and which caused the dispenser program for line service request hoppers in class D to be omitted. Turning off the line scanners, however, is of limited effectiveness because enough traffic may accumulate to again overload the machine as soon as line scanning is again permitted. Of course, once an overload has been allowed to occur, the line scanners must be turned off. Accordingly, it would be desirable to provide some means for forestalling the occurrence of central control overload and thereby permit central control to process calls at high load.

In a prior system, an overload was also possible under a heavy load which had not yet grown large enough to cause the specified class E revisit time to be exceeded. The work load which is placed on the machine varies greatly with the particular type of hopper being emptied. Hoppers emptied in conjunction with the dialing of the last digit of a telephone number generate work which accounts for about three-eighths of total base-level processing time. About one-eighth of base-level time is spent in connecting a new call through the switching network to a receiver and in returning dial tone to the calling station. Small fractions of base-level time are spent processing the digits received during dialing. The rest of base-level processing time is spent in processing for ringing trip and hang-up. The actual process of emptying a hopper entails a relatively modest amount of time. So, too, does the actual processing of the entries in certain of the hoppers such as the line equipment numbers in the line service request hopper. The processing of these entries results in a switching network connection being established between each of the calling lines whose equipment number is listed in the hopper and one of the originating receivers. However, when the line which has been connected to an originating receiver completes the transmission thereto of the called number signals, either by the completion of dialing or of key button tone signaling, a processing work load is generated which requires approximately three times the amount of time taken to connect the calling lines to the originating receivers. Thus, in the prior system, if the line service request hopper was nearly full, as soon as that hopper was unloaded, a work load was placed on the system which tended to cause an immediate overload even though the class E revisit time had not yet become excessive.

SUMMARY OF THE INVENTION

In accordance with the principles of the present invention, an indication of the occupancy of a stored program controlled data processing machine is periodically obtained and is employed to control the rate at which new work entries are taken from the hoppers for processing. The indication of processor occupancy is obtained by selecting a particular class of work which the processor repetitively performs under normal conditions and measuring the time interval between the repetitive performances. In the illustrative system, certain routine maintenance tasks (base-level class E work) are performed once during each cycle of base-level work. Since the time spent in each of the other classes of base-level work (classes A through D) increases as the work load presented to the machine increases, the time required for the machine to complete a processing cycle, the E-to-E time, is a measure of machine occupancy. When the E-to-E time exceeds a predetermined limit, the number of new work entries taken from one of the base-level hoppers, such as the line service request hopper in class D of base-level work, is decreased so that no more line service request entries will be removed from the hopper than can be processed without further increasing the E-to-E time. If the next time that the E-to-E interval is measured it still exceeds the predetermined amount, the number of line service request entries taken from the hopper is further decreased. In this manner, at high load conditions the machine is still permitted to process work in each of its base-level classes without allowing the work generated by any particular base-level class to unduly prolong the entire processing cycle. Later, when the E-to-E time is less than a predetermined amount, an increased number of entries is permitted to be taken from the line service request hopper during each processing cycle.

In the illustrative embodiment, the logic for taking entries from the line service request hopper operates during base-level class D work. On each visit to the line service request hopper, entries are removed either until the hopper is empty or until the quota for a single visit to the hopper is reached. If more entries have been removed than a quota established for a 5-second interval, no more entries are removed. The quota for the 5-second interval is set at 32 times that which may be removed during a single visit to the hopper inasmuch as approximately 32 visits to base-level class D are expected to occur in 5 seconds when the system is operating at maximum capacity. The limit per visit prevents line service request hopper entries from being served en masse at the start of each new 5-second interval. The limit per 5-second interval, on the other hand, prevents too many entries from being served when a number of short E revisit times follow one another. The maximum number of entries permitted to be processed in the 5-second interval is termed the acceptable calling rate.

In the illustrative system, the E revisit interval is actually measured during the J-level interrupt and a record is kept of the E revisit times for the last 3 visits to base-level class E. Measuring the E revisit time during the clock controlled J-level interrupt assures that prompt action can be taken if a long E revisit interval is detected. If the last three E revisit times average more than 1 second, the calling rate is decreased by approximately 6 percent and further changes in the calling rate are inhibited for the next 3 seconds. If the average of the last three E revisit times exceeds 1.8 seconds, the logic operative during J-level interrupt places the system in the overload state. In the overload state, the scanning of lines for new service requests is omitted. If a single E revisit time takes as long as 8 seconds, emergency action processing is initiated to learn the cause of the unusual delay and to take the next remedial action. Once an overload condition is detected, the system is forced to remain in the overload state for 1 second after detecting an E revisit time lasting more than 1.25 seconds. Thereafter the system is permitted to return to the normal state but the maximum calling rate is decreased by 6 percent. If the system has been operating in a normal state, the maximum calling rate may be adjusted upward by 6 percent during base-level class E provided that no E revisit time has exceeded 1 second during the preceding 5 seconds.

DESCRIPTION OF THE DRAWING

FIGS. 5 and 6 show the temporary memory of the system of FIG. 1 modified in accordance with the principles of the present invention.

DETAILED DESCRIPTION

1. General Processor Description—FIG. 1

To facilitate the understanding of the principles of the present invention, a known stored program controlled data processing machine has been selected in which the application of these principles will be described. The stored program machine shown in FIG. 1 has heretofore been disclosed in the Bell System Technical Journal, Sept. 1964, particularly pages 1929-31, 1941-47 and 2005-9, and in R. W. Downing et al. application Ser. No. 334,875 filed Dec. 31, 1963 now Pat. No. 3,570,008 issued Mar. 9, 1971. Reference may also be made to the copending application of J. A. Harr application Ser. No. 590,928, filed Oct. 31, 1966, for a further description of the type of data processing system to which the principles of the present invention are applicable. Accordingly, the operation of the machine depicted in FIG. 1 will now briefly be described as background for the ensuing description of FIGS. 2 through 6.

The data processing system comprises a program store 102 and a changeable temporary store or call store 103, both hereinafter from time to time generically being referred to as the memory. The address of an instruction in program store 102 is transmitted from the program address register PAR over bus 6400 to the program store. The address is generally incremented in each cycle of operation by the add-one circuit AO in order to obtain successively numbered instructions. One of the sequencers in block SEQ interrupts the normal execution of orders and controls a transfer to a timetable program at the beginning of every five millisecond interval. Thereafter, since the address in the program address register PAR is continuously incremented, the instructions in the timetable program are executed in sequence.

Information contained in call store 103 is read by transmitting the address of the desired call store word over bus 6401. The selected word is read out on transmission bus 6501 and entered into data buffer register BR. To write a word into call store 103, the bits of the desired word are applied to call store write bus 6402 by buffer register BR and the location in which the word is to be written in the call store is applied to bus 6401 by index adder IA. A central pulse distributor CPD (not shown) is provided to communicate with peripheral units (not shown) and is addressed over buses 6403 and 6404. Communication with various network units is possible over bus 6406. Information from peripheral points in the system is returned to the processor over scanner answer (SA) bus 6600 and entered into the logic register LR.

Figure 1:
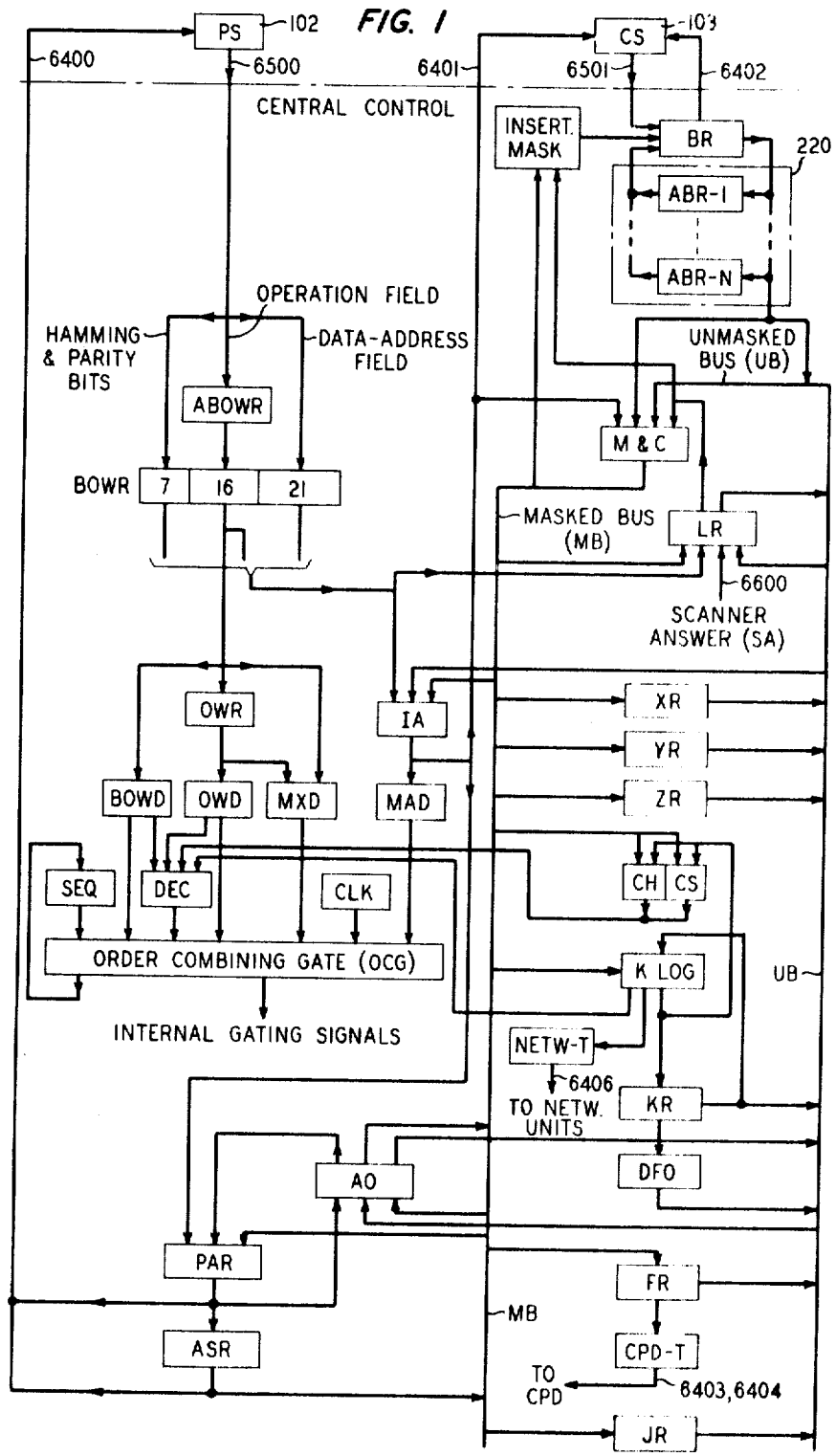
FIG. 1 shows an illustrative stored program data processing system in block diagram form.

The equipment shown on the left side of FIG. 1 is used to determine the action to be taken in accordance with the instructions read out of program store 102. Each instruction, in addition to Hamming and parity bits for error detection and correction may include, as shown also in FIG. 1, an operation field, a data-address field, and an index register identity. The three parts of each instruction, when shown hereinafter, are separated by commas. When a part of an instruction is to be omitted, an extra comma is used as a marker to that effect.

When program store 102 is read out, the operation field portion of a program order word is gated into the auxiliary buffer order word register ABOWR while the data-address field and the Hamming bits of the order word are directly gated into the buffer order work register BOWR. The auxiliary buffer order word register ABOWR is provided before the register BOWR to prevent an operation field being placed in the register BOWR before it has been cleared of the prior order word. The numbers 7, 16 and 21 inside the buffer order word register indicate, respectively, the number of bits available to represent the 7 possible Hamming and parity bits, the 16 possible operation code and index register identifying bits, and the 21 data-address indicating bits. The data-address (DA) field is then transmitted to the index adder IA where indexing takes place if required. In the indexing step the DA field is modified by the addition to it of the word contained in one of the system registers, e.g., register XR. The sum derived by the index adder is the data or the address used in the execution of the order.

As multiple cycle overlap operation is possible in this system, an order word register OWR is provided in addition to the buffer order word register BOWR, together with their respective decoders OWD and BOWD; a mixed decoder MXD resolves conflicts between the program words in the two registers OWR and BOWR. The outputs of the decoders, together with selected clock signals from clock source CLK, are combined in the order combining gate circuit OCG which operates selected gates in the proper time sequences. The order combining gate circuit OCG thus generates the proper sequences of gating signals to carry out the indexing cycle and the execution cycle of each of the sequences of orders in turn as they appear first in the buffer order word register BOWR and then in the order word register OWR.

A memory address decoder MAD decodes the addresses from the index adder IA and controls the order combining gate circuit OCG to direct properly addressed equipment, e.g., the program store, call store, or registers.

The internal data processing structure is built around two multiconductor buses, the unmasked bus UB and the masked bus MB, and a link for moving a data word from one register to another. The mask and complement circuit M&C connects the unmasked bus to the masked bus and provides means for logically operating upon the data as it passes from the former to the latter. The logical operation to be performed, which may include among others, product mask (AND), union mask (OR), exclusive-OR mask EXCLUSIVE-OR), and complementing, is prescribed by the operation field of the instruction word as decoded by either the buffer order word decoder BOWD or the order word decoder OWD.

Decision logic circuit DEC is provided to permit the executing of decision orders which either permit the processor to continue with the execution of the current sequence of orders or to transfer to a new sequence of orders. The decision order specifies that certain information is to be examined as the basis for the decision. The information is obtained from the control homogeneity circuit CH or the control sign circuit CS, or selected outputs of the K logic circuit KLOG. The basis of the decision may be that the information examined is arithmetic zero, less than zero, greater than zero, etc.

As mentioned above, a plurality of sequence circuits SEQ are provided, which circuits share control of the data processing with the various decoders. These circuits contain counter circuits, the states of which define the gating actions to be performed by the sequence circuits. The sequence circuits control the time of operation and execution of various of the orders.

2. Interrupt Logic System—FIG. 2

In the illustrative system, the clock circuit CLK (FIG. 1) generates a signal every 5 milliseconds which is transmitted through the order combining gate OCG to one of the auxiliary buffer bus registers ABR-1 through ABR-$m$ to interrupt normal processing of information. The auxiliary buffer bus register then initiates a sequence of actions which causes the central processor to execute the J-level interrupt program store in program store 102.

Figure 2:
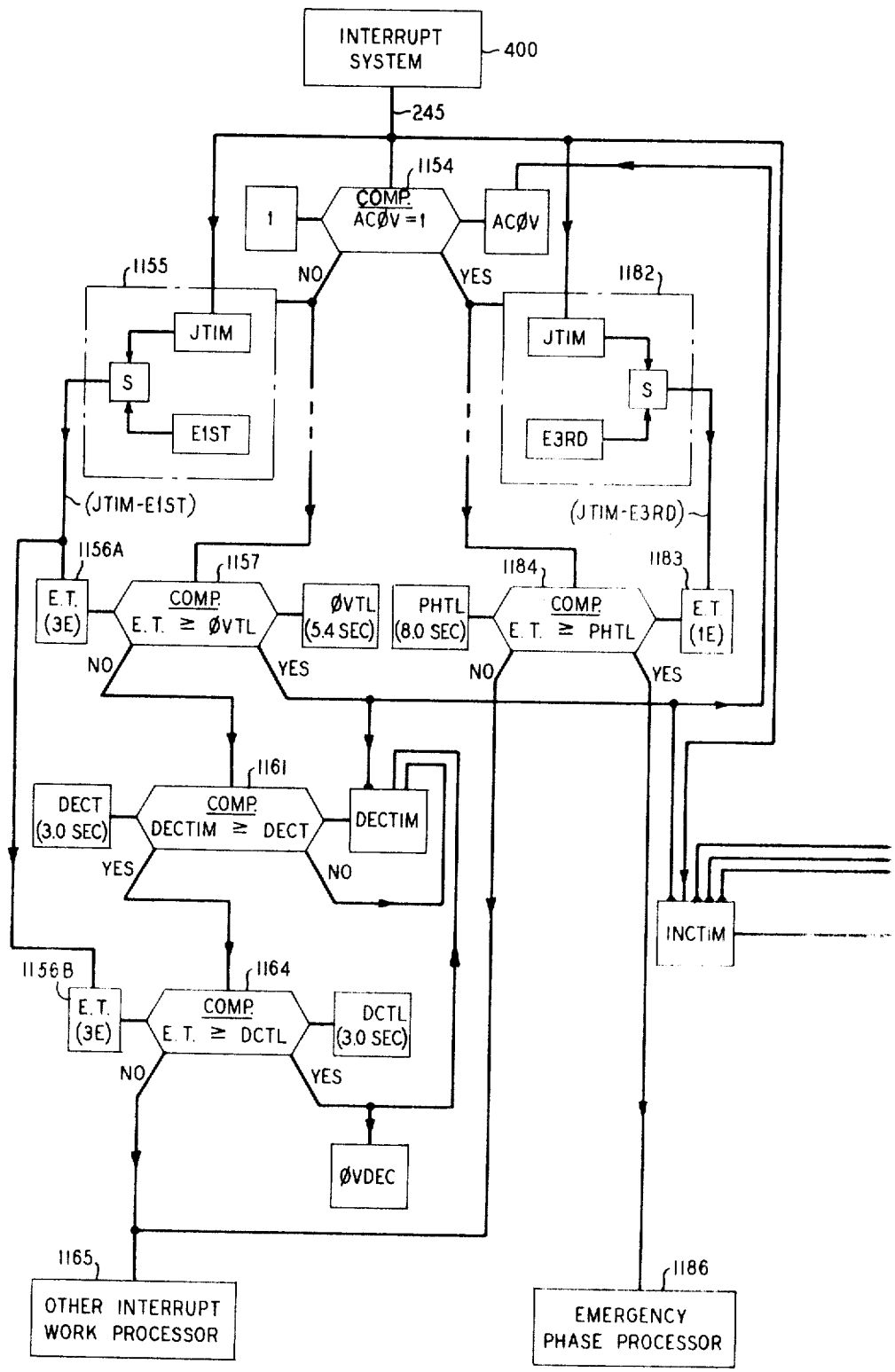
FIG. 2 shows the logic controlled by the interrupt system of the illustrative embodiment of FIG. 1.

The configuration of the processor when executing the J-level interrupt program is indicated in FIG. 2 by the J-level interrupt system 400.

In FIGS. 2 through 4B, an illustrative arrangement of the logic blocks has been shown but it will be apparent to those skilled in the art that numerous modifications thereof may be made. The arrangement as shown, however, has certain advantages from the standpoint of describing the functional operation of the system. Thus, in FIG. 2 for example, several comparator circuits 1154, 1157, 1161, 1164, etc., have been shown whereas it is apparent to those skilled in the art that only one such comparator circuit may be provided if suitable gating and sequencing circuits are provided to steer or connect the inputs and outputs of the comparator circuit to the other circuits and memory cells in the system.

Every 24th time that the J-level interrupt system 400 is activated, i.e., every 120 milliseconds, path 245 is activated. Activation of path 245 increments counters INCTIM and JTIM, the latter being shown as part of calculators 1155 and 1182, FIG. 2, and also as part of calculator 3-621 in FIG. 3. After incrementing these counters, memory cell ACOV is interrogated by comparator 1154. Assuming that memory cell ACOV is not set, i.e., ACOV≠1, comparator 1154 activates elapsed time calculator 1155. Elapsed time calculator 1155 subtracts from the time registered in counter JTIM the time recorded in cell E 1ST. Cell E 1ST was supplied with the value of JTIM when base-level class E was performed three visits ago. The elapsed time (JTIM-E1ST), is then entered into elapsed time cell 1156 and compared with the contents of cell OVTL. Cell OVTL is also shown in its assigned location, E20VTL, in call store 103 in FIG. 5. Assuming the elapsed time does not equal or exceed the limit in cell OVTL, comparator 1161 is enabled. Comparator 1161 compares the count accruing in counter DECTIM with the contents of memory cell DECT. If the count accruing in DECTIM equals or exceeds the contents of cell DECT, comparator 1164 is enabled. Comparator 1164 compares the contents of elapsed time cell 1156B with the contents of memory cell DCTL. If the contents of elapsed time cell 1156B equals or exceeds the contents of cell DCTL, memory cell OVDEC is set to "1" and counter DECTIM is reset to "0." If the contents of elapsed time cell 1156B was less than the limit prescribed by the contents of cell DCTL, comparator 1164 activates other interrupt work processor 1165.

In the above sequence of operations, had comparator 1154 detected that memory cell ACOV was set to "1," it would have activated elapsed time calculator 1182 to compute the difference between the contents of counter JTIM and memory cell E 3RD. It will be assumed that memory cell E 3RD had recorded the contents of counter JTIM at the last visit of the processor to base-level class E. Comparator 1184 compares the elapsed time (JTIM-E3RD) since the last visit to class E base level work (as given by the output of calculator 1182) with the contents of memory cell PHTL. If this latest E—E time does not equal or exceed the time limit (8.0 seconds) stored in memory cell PHTL, processor 1165 is activated. On the other hand, if the elapsed time equals or exceeds the limit, emergency phase processor 1186 is activated.

In the above sequence, if comparator 1157 had determined that the contents of elapsed time register 1156A equaled or exceeded the time limit stored in memory cell OVTL, counters DECTIM and INCTIM would be set to "0" and memory cell ACOV would be set to "1."

3. Base-Level Class E Logic System—FIG. 3

It was previously mentioned that the time it takes the processor to return to the processing of base-level class E work is measured during the J-level interrupt. Accordingly, the actual time at which the system begins to process base-level class E work is known to the degree of accuracy determined by the interval between J-level measurements. Since the J-level measurement occurs every 120 milliseconds, that is the degree of accuracy to which the E—E time is measured. For all practical purposes this suffices. Accordingly, when the system enters to execute base-level class E work it will first execute certain "housekeeping" tasks such as the updating of the memory cells E3RD, E2ND, and E1ST of call store 103 shown in FIG. 5. The logic for updating these areas of the call store is indicated in a general way in FIG. 3 by logic block 3-613. Any known table rearrangement logic may be employed and, accordingly since the details are known to those skilled in the art, they are not necessary to be set forth. Briefly, however, when the system enters base-level class E, update logic 3-613 will update cells E3RD, E2ND, and E1ST in call store 103, FIG. 5. This may, advantageously, be accomplished by logic block 3-613 first moving E2ND to E1ST and placing E3RD in E2ND.

Prior to being shifted to E2ND, the old value of E3RD is subtracted in calculator 3-621 from the value of JTIM. JTIM has recorded in it the time of the J-level interrupt, as described in connection with FIG. 2. The result of this subtraction, which is the latest E—E time, is entered into temporary register 3-621A. After the calculation of the most recent E—E time, comparator 3-624 is activated to determine if memory cell ACOV has been set to "1" as the result of the operation of the J-level interrupt logic of FIG. 2. If it has, the system is in the overload state and comparator 3-636 is energized to determine if the latest E—E time stored in temporary register 3-621A is less than the value of OVJM (1.25 seconds in the illustrated system). If the latest E—E time is less than 1.25 seconds, comparator 3-636 activates comparator 3-639 to compare the latest count in INCTIM with the contents of memory cell OVIM (1.0 seconds in the illustrative system). If the count accruing in INCTIM is greater than 10 seconds, memory cell OVOFFI is set to "1" to request the termination of the overload state and the count accruing in INCTIM, FIG. 2 is zeroed. If the count accruing in INCTIM does not exceed 1.0 second, comparator 3-636 activates class E work processor 3-645 and the system proceeds to execute the remainder of base-level class E work items. In the above sequence of operations if comparator 3-636 had determined that the most recent E—E time was not less than 1.25 seconds, comparator 3-636 would have merely zeroed the count accruing in counter INCTIM (FIG. 2).

Thus far it has been assumed that comparator 3-624 determined that the system was in the overload state, i.e., cell ACOV had been set to "1." However, if cell ACOV was not in the "1" state, comparator 3-624 would have activated comparator 3-627 to determine whether the latest E—E time in temporary register 3-621A was less than the 1.0 second limit stored in memory cell NOJM. If the E—E time is not less than the 1.0 second limit stored in NOJM, comparator 3-627 merely zeros the count accruing in counter INCTIM, FIG. 2. However, if the E—E time is less than 1.0 second, comparator 3-627 activates comparator 3-630. Comparator 3-630 determines whether the count accruing in the INCTIM exceeds the 5.0 seconds limit stored in memory cell NOIM. If it does, memory cell OVOFFI is set to "1" to request the termination of the overload state prior to the activation of class E work processor 3-645. On the other hand, if the count accruing in INCTIM does not exceed 5.0 seconds, class E work processor 3-645 is immediately activated by comparator 3-630. The base-level class E work processor 3-645 executes the normal class E tasks described in the above-mentioned Bell System Technical Journal article and it will not be further detailed herein.

4. Base Level Class D Logic System

Figures 3, 3A:
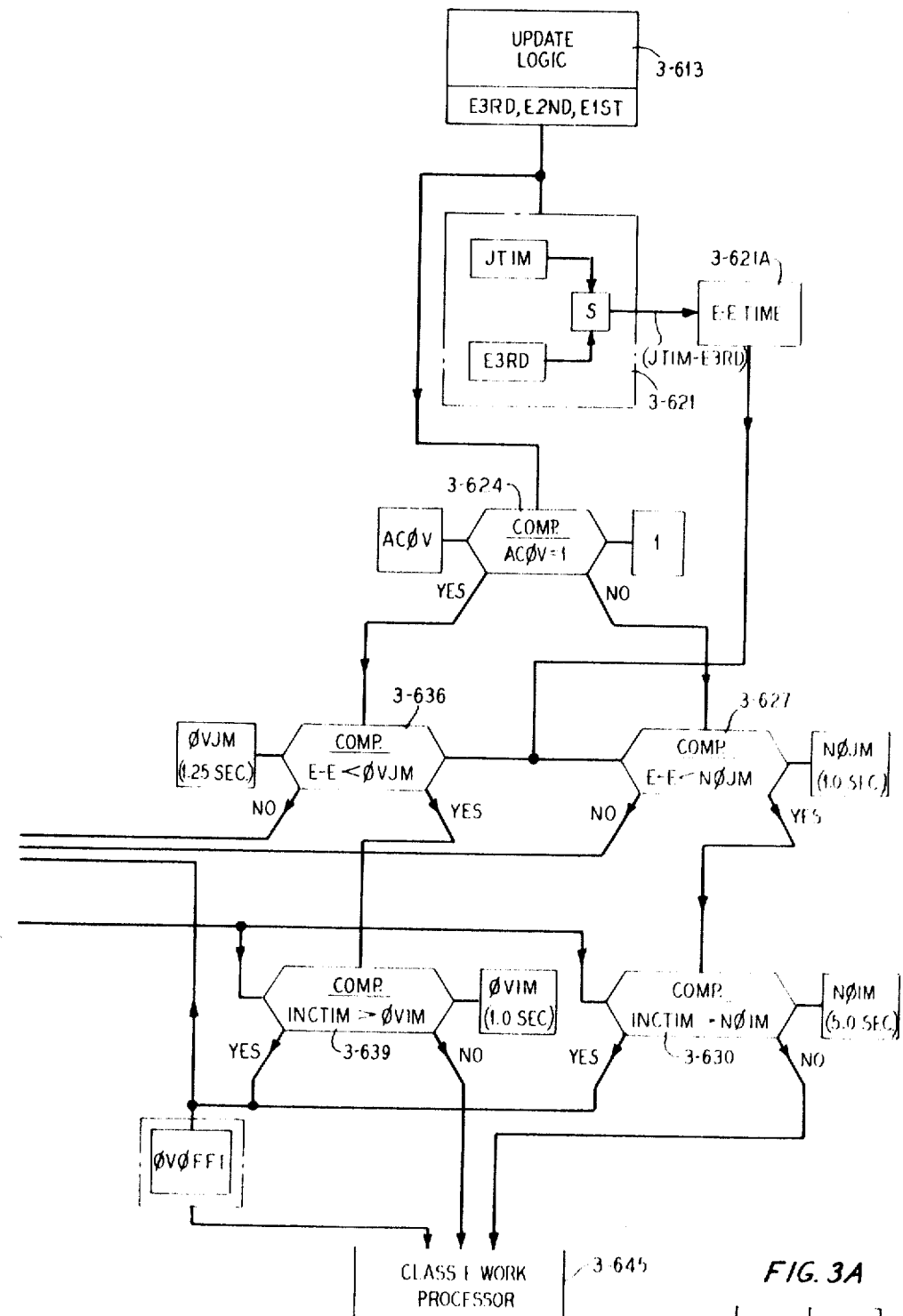
FIG. 3 shows the logic controlled during base-level class E work in the illustrative arrangement, FIG. 3 being placed adjacent FIG. 2, as indicated by FIG. 3A.
Figure 4B:
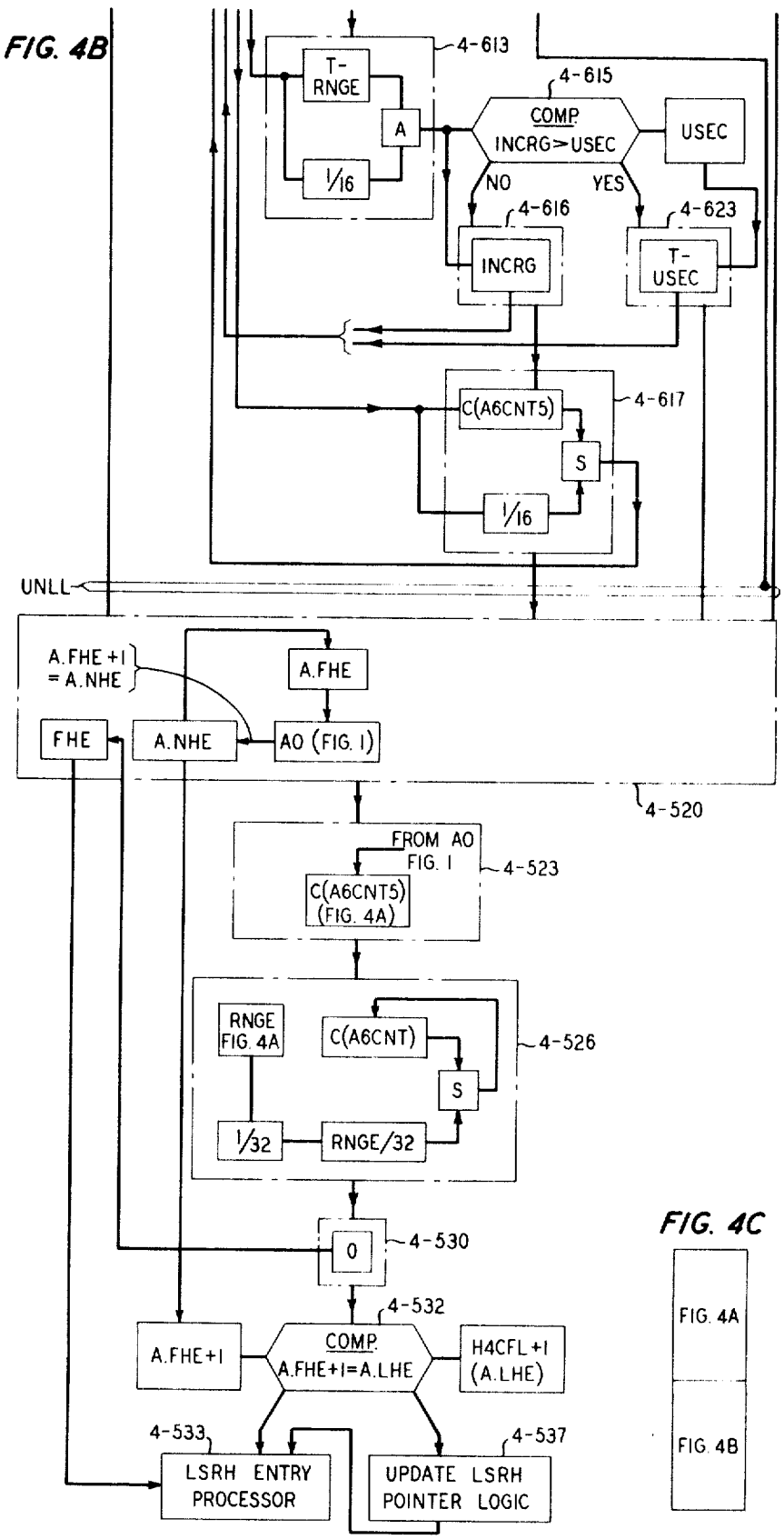
FIGS. 4A and 4B show the logic controlled during base-level class D work for taking entries from the temporary memory input data buffer (hopper) of FIG. 6, FIG. 4A being placed above FIG. 4B, as indicated in FIG. 4C.
Figure 4C:
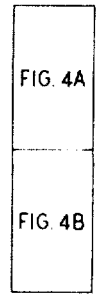
Figure 4A:
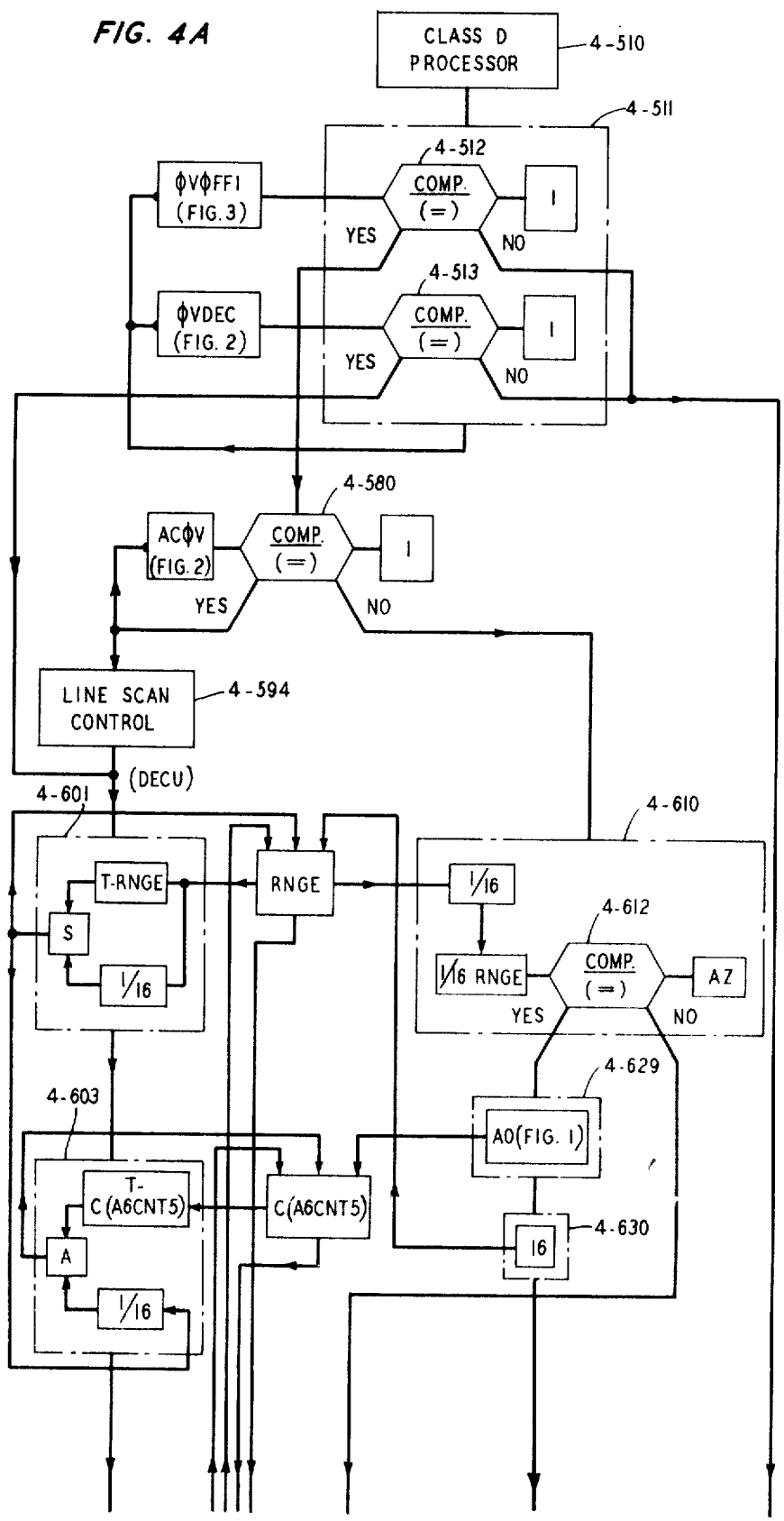
Figure 6:
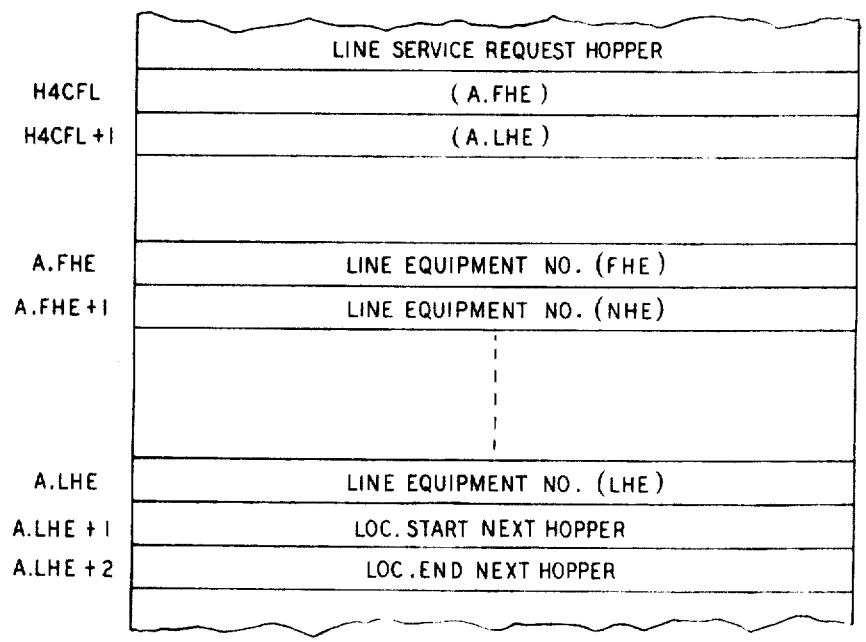

Turning now to FIGS. 4 and 4B, the logic provided in accordance with the principles of the present invention which is operative during base-level class D work will now be described. At some point in the execution of class D level work, class D processor 4-510, FIG. 4A, will activate comparator circuits 4-512 and 4-513 of comparator logic 4-511. Comparator 4-512 determines whether memory cell OVOFFI is set. As will be recalled from the description of FIG. 3, this flag could have been set by either comparator 3-639 or 3-630 (FIG. 3) depending upon whether the system was in the overload state and was ordered to return to normal, or whether the system was in the normal state and was ordered to increase the rate of acceptance of entries from the line service request hopper (FIG. 6). Accordingly, if memory cell OVOFFI had been in fact set to "1" by the class E logic of FIG. 3, comparator 4-512 will energize comparator 4-580 (FIG. 4). Comparator 4-580 determines if the system is in the overload state by checking whether memory cell ACOV is set to "1."

For simplicity of the drawing, memory cell ACOV has been shown in each of FIGS. 2, 3, and 4, although it will be appreciated (as has heretofore been said of the various comparators) that only one such memory cell actually needs to be provided.

If the system was determined to have been in the overload state, comparator 4-580 orders memory cell ACOV to be reset to zero and activates line scan control circuit 4-594. Line scan control circuit 4-594 so activated resumes scanning of lines which had been prevented by the emergency phase processor 1186 (FIG. 2). Contemporaneous with the activation of line scan control 4-594, junction point DECU is activated.

At the same time that comparator 4-512 was activated by class D processor 4-510, comparator 4-513 is activated to determine whether memory cell OVDEC had been set to "1." It will be recalled that memory cell OVDEC may be set to "1" during the J-level interrupt process by the operation of comparator 1164 (FIG. 2). If the memory cell OVDEC is set to "1," comparator 4-513 activates junction point DECU. The activation of junction point DECU causes calculator 4-601 to obtain the present contents of memory cell RNGE and enter it into the temporary register T-RNGE of calculator 4-601, to subtract from temporary register T-RNGE one-sixteenth the value of its contents and to return the result of that subtraction to memory cell RNGE. The result of the operation of calculator 4-601 is to reduce the value specified in RNGE by approximately 6 percent. Accordingly, it is seen that the operation of calculator 4-601 reduces the value of RNGE by 6 percent when the system has been in the overload state but had been ordered by the presence of a "1" in memory cell OVOFFI to return to the normal state, or when the presence of a "1" in memory cell OVDEC had directly ordered the acceptable calling rate to be decreased. The contents of memory cell RNGE specifies the maximum number of line service request entries permitted to be unloaded in a time period which is determined by the value specified in memory cell AMAX (FIG. 5). In an actual embodiment of the system, the number specified in cell AMAX is for convenience set at twice the number of seconds in the desired time period. The value of the contents of memory cell RNGE varies dynamically with the work load of the system. The maximum value which the contents of memory cell RNGE is permitted to attain is specified in memory cell USEC. The operation of calculator 4-601 results in the activation of calculator 4-603. Calculator 4-603 receives in temporary register T-C (A6CNT5) the present contents, C(A6CNT5), of the memory cell at A6CNT5 (shown also in FIG. 5) and then increases the contents C(A6CNT5) of the memory cell by one-sixteenth of the new value of RNGE computed by calculator 4-601. Prior to the operation of calculator 4-603, the memory cell at A6CNT5 contains a count of the number of line service request hopper entries actually unloaded during the specified time period. The memory cell contents C(A6CNT5) starts at the negative of the value of RNGE and counts upward. As the result of the operation of calculator 4-603, the contents C(A6CNT5) has been artificially increased for the purpose of making an approximation of the adjustment to be made in the actual count of entries unloaded in the specified time period. Following the operation of calculator 4-603, the actual unloading of the line service request hopper will be initiated by the activation of junction point UNLL, FIG. 4B. In the description thus far of FIG. 4, it had been assumed that a decrease in the line service hopper unloading rate was to be effected. However, an increase in this rate may be commanded by the presence of a "1" in memory cell OVOFFI at a time when comparator 4-580 determines that the system is not in the overload condition. Under these circumstances, comparator 4-580 activates calculator 4-610. The activation of calculator 4-610 causes one-sixteenth the value of the contents of memory cell RNGE to be computed. This is advantageously accomplished by placing the contents of memory cell RNGE into a temporary register and shifting four bits to the right. Comparator 4-612 determines whether the result of this shift will cause the value of the contents of the temporary register one-sixteenth RNGE to be equal to arithmetic zero. If it is, the value of RNGE would be too small and comparator 4-612 would activate calculator 4-629. Calculator 4-629 would decrement the count accruing in memory cell at A6CNT5 by "1" and activate calculator 4-630. Calculator 4-630 sets memory cell RNGE to an initial predetermined value. In the illustrative embodiment, the number placed into memory cell RNGE at this point is 16, expressed of course in binary notation. Upon the completion of this operation, calculator 4-630 activates junction point UNLL.

If the operation of calculator 4-610 in computing a 6 percent reduction in the value of the contents of RNGE did not result in making the value of temporary register one-sixteenth RNGE equal to arithmetic zero, comparator 4-612 activates calculator 4-613, FIG. 4B.

Calculator 4-613 receives in its temporary register T-RNGE the contents of memory cell RNGE, computes one-sixteenth the present value of RNGE and enters the sum of the present value of RNGE and one-sixteenth the present value of RNGE into temporary register INCRG. Accordingly, temporary register INCRG now contains one-sixteenth the value of RNGE. The contents of temporary register INCRG (incremented RNGE) is compared by comparator 4-615 with the value of USEC to determine which is larger. If the contents of temporary register INCRG does not exceed the value in memory cell USEC, comparator 4-615 activates transfer circuit 4-616 to update the contents of memory cell RNGE from the contents of temporary register INCRG. Thereafter, transfer circuit 4-616 activates calculator 4-617. Calculator 4-617 computes the value of A6CNT5 reduced by 6 percent and returns the result to memory cell A6CNT5. Advantageously, calculator 4-617 accomplishes this by computing one-sixteenth the present value of C(A6CNT5) and subtracting this from the present value of C(A6CNT5). If the value of C(A6CNT5) is expressed in binary notation, the computation of one-sixteenth its present value is easily accomplished by shifting the binary digits thereof four bits to the right. Calculator 4–617 thereupon energizes junction point UNLL.

If comparator 4–615 had determined that the incrementation of the contents of memory cell RNGE by 6 percent exceeded the limit specified in memory cell USEC, comparator 4–615 would have energized transfer circuit 4–623 to transfer the contents of memory cell USEC to memory cell RNGE. Thereupon transfer circuit 4–623 activates junction point UNLL.

The energization of junction point UNLL activates processor 4–520. When activated, processor 4–520 transfers the first line equipment number which is stored in the line service request hopper (FIG. 6) to a temporary register (not explicitly shown) in line service request hopper entry processor 4–533. The line service request hopper entry processor 4–533 is not, however, energized at this time to process the hopper entry. Processor 4–520 employing the add-one circuit AO, FIG. 1, computes the address A.FHE+1 of the next hopper entry (NHE) in the line service request hopper. Accordingly, the address in the next hopper entry is placed in the memory cell at location H4CFL. The memory cell at location H4CFL+1 contains the location (A.LHE) of the bottom of the line service request hopper. Processor 4–520 then activates processor 4–523. Processor 4–523 employing the AO circuit (FIG. 1) increments the contents of the memory cell at location A6CNT5. For the sake of simplicity of FIG. 4B, this memory cell has been redrawn within processor 4–523 so that connections to A6CNT5 in FIG. 4B need not be retraced. Thereupon processor 4–523 activates processor 4–526. Processor 4–526 computes a one thirty-second the present value of the contents of memory cell RNGE, subtracts it from the present value in the memory at cell A6CNT (also shown in FIG. 5) and returns the difference to the memory cell at A6CNT. In this manner, the memory cell at A6CNT is provided with the count of entries actually unloaded from the line service request hopper in the current time period. Thereupon processor 4–526 enables processor 4–530 which, in turn, zeros the contents of the first entry (FHE) in the line service request hopper (FIG. 6). Processor 4–530 then enables comparator 4–532. Comparator 4–532 compares the contents of temporary register A.FHE+1 with the contents of the memory cell at H4CFL+1, FIG. 6. If the contents do not agree, it means that the last entry in the line service request hopper has not yet been transferred to the entry processor 4–533 by processor 4–520. Accordingly, comparator 4–532 may activate processor 4–533 directly. When processor 4–533 is activated, normal call processing proceeds, as outlined in the above-mentioned Bell System Technical Journal, to process the call. On the other hand, if comparator 4–532 determines that the last entry in the line service request hopper has, in fact, been supplied to processor 4–533, memory cell H4CFL will be supplied with the contents of memory cell A.LHE+1 and memory cell H4CFL+1 will be supplied with the contents of A.LHE+2 by update pointer logic 4–537. Thereupon update logic 4–537 activates entry processor 4–533 to process the last line equipment number entry (LHE) in the line service request hopper.

While the various memory cells and temporary registers employed in the illustrative embodiment have been described in detail in connection with the description of FIGS. 2 through 4B, they have been grouped together in FIG. 5 to show how they may be advantageously arranged and inserted into the call store 103 (FIG. 1) of the prior system. In addition, by conventional clock and updating logic (not shown) every 500 milliseconds the contents of memory cell SEC5, FIG. 5, is decremented, and when the contents has reached zero, the contents of SEC5 is reset to the limit specified in E2AMAX. Thereupon the contents of A6MAX5 replaces the contents of A6CNT5. Advantageously, these adjustments to SEC5 and A6CNT5 may be performed by base-level class B logic, not shown. Of course, if the count accruing in memory cell SEC5 has not yet reached zero, neither it nor memory cell A6CNT5 are initialized. FIG. 6 shows the portion of call store 103 assigned to one of the line service request hoppers. The manner in which the entries are taken from the line service request hopper has previously been described.

It is to be understood that the above-described arrangements are illustrative of the application of the principles of the invention. Certain obvious modifications may be mentioned. For example, temporary register cells E1ST, E2ND and E3RD have been shown which record the time at which the base-level class E logic of FIG 3 was permitted to operate. Of course, the time accrued in each of these cells is in error in the illustrative embodiment because the time at which the class E logic is allowed to function is measured only during every 24th J-level interrupt. The error, therefore, may be as much as 120 milliseconds. This error, however, has not been found to interfere with the proper control of the rate at which the machine processes telephone calls. For the control of the rate of processing other types of information which may be required in other multiprocessor embodiments, it is apparent that a more accurate measurement of a time interval analogous to the E revisit time herein described may be desirable. These and other details will be apparent to the designers of such systems. It will also be apparent from the teaching herein that other measures of machine occupancy may be obtained besides measuring E time and that the measuring of machine occupancy, however derived, may be employed not only to control the rate of emptying the line service request or other buffer but also to control the rate of scanning itself, as may be desirable in systems which do not employ buffer storage. Numerous other arrangements may be devised by those skilled in the art without departing from the spirit and scope of the invention.

What is claimed is:

1. In a stored program data processing machine which returns to perform certain routine tasks after performing various other classes of work and which stores the requests to perform each of the various classes of work in hoppers, the improvement comprising means for measuring the time it takes the machine to return to performing said routine tasks and means controlled by said measuring means for selecting a variable number of work-requesting items to be taken from any of said hoppers at any one time by said machine.

2. In a stored program data processing machine according to claim 1, the improvement wherein said means for measuring said time comprises periodically incremented counter means, said counter means being reset each time said machine commences to perform said routine tasks.

3. In a stored program data processing machine according to claim 2, said machine having means for interrupting the processing of certain of said classes of work to perform work of higher priority, the improvement comprising means operative during an interval controlled by said interrupt means for activating said counter means.

4. In a stored program data processing machine having a plurality of logic means each operative to process a respective class of work, a plurality of hoppers for storing entries requesting the performance of a respective type of work by said logic means and means for interrupting the processing of work by said logic means in any of said classes to perform work of a higher priority, the improvement comprising counter means incremented by said interrupt means and reset by a first one of said plurality of logic means operative during a first class of work, and means controlled by said counter means for selecting a non-zero number of work requesting entries to be taken from a particular one of said hoppers by another of said plurality of logic means.

5. In a stored program data processing machine according to claim 4, the improvement wherein said means for regulating the number of said entries to be taken from said particular hopper comprises means for counting the number of entries taken from said hopper during a predetermined time interval, and means for counting the number of said entries taken from said hopper during a particular operation of said another of said logic means.

6. In a stored program data processing machine according to claim 4, the improvement wherein said counter means includes clock means and a plurality of register means, means for registering the time of said clock each time said first one of said plurality of logic means is operative.

7. In a stored program data processing machine according to claim 6 wherein said counter means includes a memory cell for storing a representation of a predetermined time interval, and means for comparing the contents of at least one of said register means with said memory cell.

8. The method of operating a stored program data processing machine having a plurality of sequentially enabled logic circuits for accepting and processing a plurality of work-requesting items of data to avoid overloading said machine, comprising timing prior to any such overload the interval required by said sequentially enabled logic circuits to complete one complete sequence of said processing of all of said items of data, and governing in accordance with said timing the number of said items to be accepted for processing by at least one of said logic circuits during a succeeding one of said complete sequences of said processing.

9. In a stored program data processing machine having a memory unit and a central control processor, said processor having a plurality of sequentially enabled logic circuits for accepting and processing a plurality of work-requesting items of data from said memory unit, the improvement comprising means for ascertaining in the absence of any overload the occupancy of said processor and means controlled by said occupancy ascertaining means for regulating the time rate at which at least one of said logic circuits accepts its respective plurality of said data items to be processed to avoid an occupancy level indicative of an overload.

10. In a stored program data processing machine according to claim 9, the improvement wherein said means for ascertaining the occupancy of said machine comprises means for measuring the elapsed time between the successive enablings of a particular one of said logic circuits.

11. In a stored program data processing machine according to claim 1, the improvement wherein said means controlled by said measuring means selects a lesser number of items to be taken from one of said hoppers as said time for returning to perform said routine tasks increases and selects a greater number of said items as said time decreases.

12. In a stored program data processing machine according to claim 11, the improvement wherein said measuring means computes an average of a plurality of the most recent times taken by said machine to return to performing said routine tasks.

13. In a stored program data processing machine according to claim 11, the improvement further comprising means for inhibiting for a predetermined time interval any change in the number of said items selected by said means for selecting said variable number of items.

14. The method of operating a stored program data processing machine according to claim 8 wherein said timing is performed by periodically interrupting said processing of all of said items to increment a counter to record the time of said interrupt, and by resetting said counter whenever a particular one of said logic circuits is enabled to accept its respective items of data to be processed.

15. The method of operating a stored program data processing machine according to claim 14 wherein said governing is accomplished by reducing the number of said items permitted to be accepted for processing by at least one of said sequentially enabled logic circuits when said time exceeds a predetermined first value and by thereafter increasing said number when said time does not exceed a second predetermined value.

16. The method of operating a stored program data processing machine according to claim 15 wherein said increasing of said number is permitted only after said time has not exceeded said second predetermined value during the continuance of a third predetermined interval.

17. A stored program data processing machine which is adapted to process work items stored in different storage hoppers in its memory on a sequential basis, the machine normally proceeding to visit the next hopper in sequence after processing all of the items in the precedingly visited hopper such that work items are taken from each of the hoppers in rotation characterized in that the stored program data processing machine also includes a first arrangement (1155, JTIM, 0VDEC, INCTIM, 400, 3–613, 3–621) for measuring the time it takes the machine to complete processing all of the work items commencing with a first one of the hoppers and proceeding through the remaining hoppers in the normal sequence until the machine is ready again to process whatever new items have been entered into the first hopper, such time being an indication of machine occupancy, and a second arrangement (0V0FFI, 0VDEC, RNGE, 4–520) controlled by the first arrangement for selecting a variable number of work items to be taken from any particular one (FIG. 6) of the hoppers when that hopper is visited by the processor in its normal sequence whereby the number of work items to be taken for processing from said particular hopper is controlled to be no more than the machine can be expected to handle at the measured level of occupancy and so that at least some of the items in each hopper are so normally taken to be processed.

* * * * *